United States Patent
Delaney et al.

[11] Patent Number: 5,749,602
[45] Date of Patent: May 12, 1998

[54] MEDICAL DEVICE

[75] Inventors: Michael R. Delaney, Springfield, Mo.; Allen D. Tilley, Chapel Hill, N.C.

[73] Assignee: Mend Technologies, Inc., Dallas, Tex.

[21] Appl. No.: 681,836

[22] Filed: Jul. 29, 1996

Related U.S. Application Data

[60] Provisional application No. 60/001,705 Jul. 31, 1995.

[51] Int. Cl.⁶ .................... B01D 46/42; F16L 27/00
[52] U.S. Cl. .................... 285/61; 285/64; 285/181; 285/184; 55/279; 604/22
[58] Field of Search ............... 285/181, 184, 285/61, 64, 45, 55; 248/104; 604/22, 21, 23; 55/279, 217, 256, 274, 276

[56] References Cited

U.S. PATENT DOCUMENTS

| | | | |
|---|---|---|---|
| 4,114,847 | 9/1978 | Bogensberger | 248/104 |
| 4,158,462 | 6/1979 | Coral | 285/61 |
| 4,701,193 | 10/1987 | Robertson et al. | 55/217 |
| 4,735,603 | 4/1988 | Goodson et al. | 604/21 |
| 4,906,261 | 3/1990 | Mohajer | 55/256 |
| 5,215,338 | 6/1993 | Kimura et al. | 285/921 |
| 5,226,939 | 7/1993 | Nicolas et al. | 55/309 |
| 5,417,655 | 5/1995 | Divilio et al. | 604/22 |
| 5,578,000 | 11/1996 | Greff et al. | 604/22 |

OTHER PUBLICATIONS

"Surgical Products" Magazine, Apr. 1993, p. 20, an advertisement of Surg/Assist, Inc., regarding its product Model SA-1A smoke evacuation system.

*Primary Examiner*—Eric K. Nicholson
*Attorney, Agent, or Firm*—Jonathan A. Bay

[57] ABSTRACT

A medical device comprises an articulated string of hollow plastic beads which lock into each other. The medical device will attach to an operating-room table-rail and hold a nozzle or suction scoop in a given position near the surgical site to evacuate airborne hazardous smoke fumes. The medical device will eliminate the need for an operating room nurse who in the past may be been solely responsible for manually holding the prior art nozzles or suction scoops in the vicinity of the surgical site. A surgeon will be able control by one hand the aiming and positioning of the nozzle or suction scoop by grabbing and configuring the medical device via a quick thrusting action. The medical device will remain in place until moved into another position.

9 Claims, 4 Drawing Sheets

MEDICAL DEVICE

CROSS-REFERENCE TO PROVISIONAL APPLICATION

This application claims the benefit of U.S. provisional application No. 60/001,705, filed Jul. 31, 1995.

BACKGROUND OF THE INVENTION

This invention relates to medical devices and, more particularly, to a medical conduit and holding device used as an accessory on an operating room table.

Various common surgical procedures used presently in the operating rooms of facilities that range widely from large hospitals to sufficiently equipped clinics, often include the intentional act of burning tissue. Examples of such procedures include not only cauterization but also laser-assisted surgical procedures as diverse as breast reduction and cancerous-tissue removal. It is a problem with surgical procedures like the foregoing that the action of burning tissue produces airborne smoke fumes. For example, in a breast reduction operation, so much smoke can be produced that, at the point of origin, the smoke rises in a plume like a cigarette smoke plume.

Those airborne smoke fumes that waft about in the operating room, especially if originating from diseased or cancerous tissue, is a health and safety hazard. Regulations exist or are being implemented, for example by federal authorities empowered by Occupational Safety and Health Act, that address the containment of such airborne hazardous smoke fumes. Sometimes, but not all, steps are taken by the responsible health officials to contain or evacuate these airborne hazardous smoke fumes.

At the present time, the hoses used to evacuate airborne and hazardous smoke fumes during a laser-type operation are held by an operating room nurse and positioned as the surgeon directs. Holding and directing the hose can be the primary and often the sole function performed during the operation by such nurse.

One problem with that method is that it is a wasteful use of an operating room nurse's time. By way of background, an operating room typically has two classes of nurses in attendance. One class is a scrub nurse. A scrub nurse has thoroughly scrubbed and sterilized him or herself sufficiently so that he or she will be allowed to join the surgeon in a "sterile area" which is defined around the patient. The other class of nurse in attendance is the circulating nurse. The circulating nurse has not scrubbed or sterilized him or herself to the same extent, and accordingly is not permitted to enter the sterile area. As a matter of economics, each scrub nurse in attendance generally adds more to the cost of any given surgical procedure than the attendance of a circulating nurse.

The circulating nurse is partly responsible for handling surgical instruments stored outside the sterile area, and transferring them to a surgeon or scrub nurse inside the sterile area, via a procedure called a "sterile transfer." Usually, to accomplish a sterile transfer, the circulating nurse grabs a given surgical instrument that is enclosed within a sterile wrap, peels the wrap back to expose a portion of the instrument, and extends the instrument out to the surgeon or scrub nurse in the sterile area to allow them to grasp the exposed portion of the instrument for use as desired.

And so, if a decision is made to practice safety and evacuate airborne hazardous smoke fumes during surgery, that same decision presently entails including an additional scrub nurse whose sole function is to handle and direct the evacuators nozzle at the smoke, or to add to the responsibilities of the primary scrub nurse, who is already encumbered with numerous other duties. The evacuators nozzle typically is connected to suction and filtration equipment, which is not part of this invention, that ordinarily can filter 0.2 micron (i.e., 5 angstroms) particles at an efficiency of 99.999 percent. The ON and OFF operation of the suction equipment is usually toggled back and forth by the surgeon via a foot pedal. It is the job of the responsible scrub nurse, however, to direct the nozzle as directed by the surgeon.

It would be a desirable improvement to provide a holding device that could hold the evacuators nozzle in a given position and orientation if such a holding device could be easily manipulated by the surgeon to set in the desired position and orientation by one hand. Such an improvement would eliminate the need for the excess scrub nurse whose job it is to hold and aim the nozzle.

Medical holding devices are known. However, many of the known holding devices—like goose neck conduits—are resilient and thus are biased to return to their normal position after having been set and aimed at a particular location. Goose neck conduits and the like would not eliminate the need for the excess scrub nurse. Other kinds of holding devices comprise multiple links that are articulated together at pivotal joints that are set in rigid alignments by means of tightening thumb screws and the like. Again, these other kinds of known holding devices do not eliminate the need of the excess scrub nurse, unless the surgeon wishes to use both his or her hands to aim and set the nozzle in the desired location. What is needed is an improvement which addresses the foregoing shortcomings.

SUMMARY OF THE INVENTION

It is an object of the invention to eliminate one nurse's function during surgical procedures such as cauterization and laser-surgery in which the responsibility of this one nurse may be solely to point a vacuum nozzle at the fumes produced by burnt tissue in such surgery.

It is another object to allow the surgeon to direct the evacuating device precisely at the point he or she wishes rather than be obliged to rely on hand gestures to nurse mentioned above.

It is yet another object of the invention to reduce costs by providing a multicomponent device in which various ones of the components are either re-usable or disposable depending upon what makes most cost sense under the circumstances.

These and other aspects and objects are provided according to the invention in a medical conduit/holding device. The device has a base end formed as clamping fixture, and an opposite end formed as a nozzle or scoop to draw in airborne hazardous smoke fumes. Extending between the clamping fixture and nozzle are numerous segments chained together to form an articulating conduit or arm to hold the nozzle in various positions around the surgical site relative the stationary clamp. It is an inventive aspect that such a medical conduit/holding device simplifies and thus reduces the cost of evacuating airborne biological waste by allowing a user of the device to specifically aim the nozzle at the surgical site, and with the aid of the articulating hose created by the numerous segments, do so quickly, accurately and without the need for a nurse assistant to hold the smoke evacuator hose (9) or nozzle. Put differently, the medical conduit/holding device in accordance with the invention does the job and thereby replaces the nurse assistant who has commonly been required to physically and manually hold to the nozzle in place near the surgical site.

It is optionally preferred if the medical conduit/holding device include a presterilized disposable plastic sheath that will fit over the length of the medical conduit/holding device and isolate the non-sterile device from the sterile area of the operation. Various components of the medical conduit/ holding device, including without limitation the clamp fixture, shall be re-usable as it is isolated from the sterile area by the sterile sheath. Other components such as the plastic sheath shall more likely be designated as disposable parts, suitable for one use only. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE INVENTION

Figure 1:
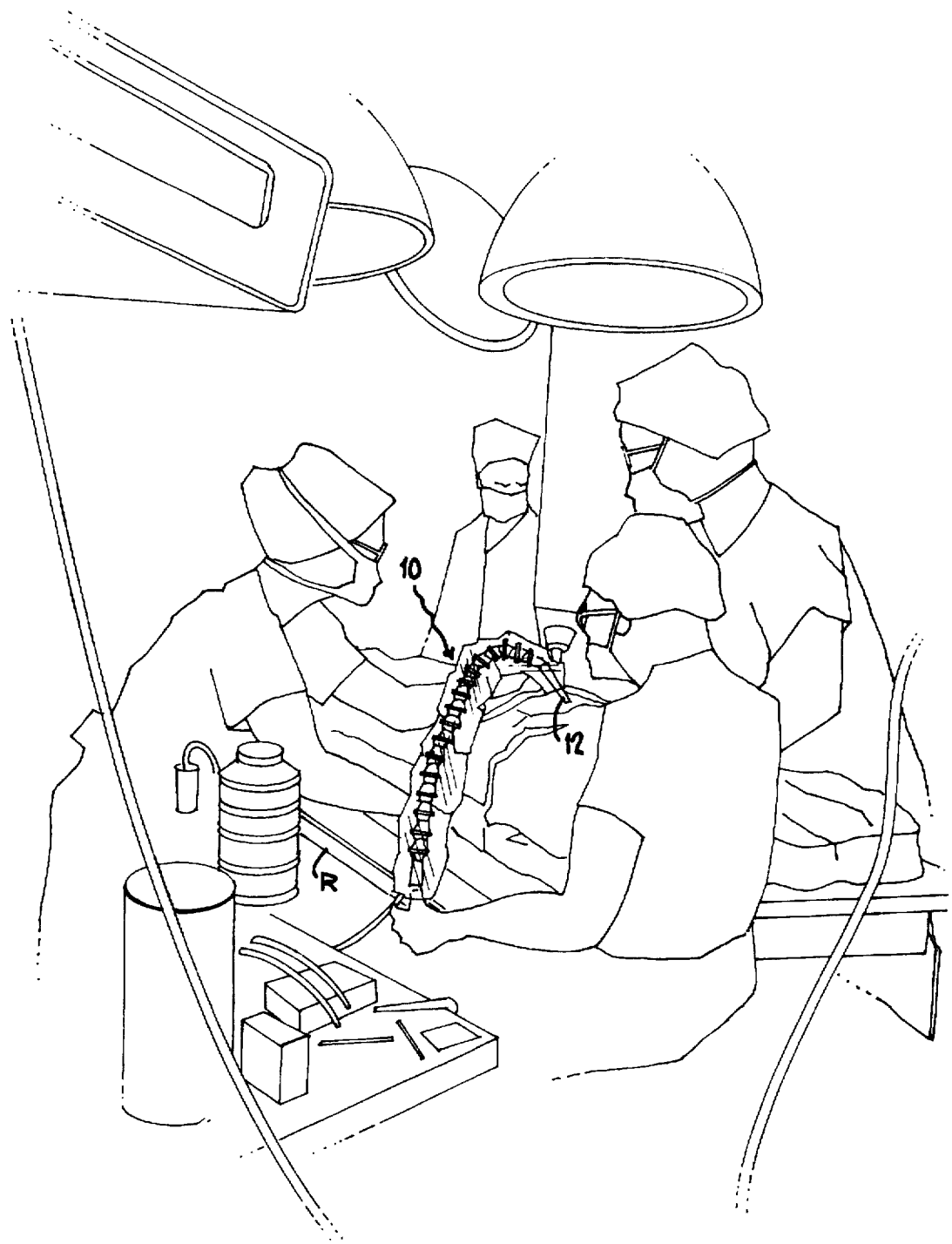
FIG. 1 is a perspective view of a medical conduit/holding device in accordance with the invention, as shown deployed in a representative operating room to illustrate the working environment therefor.

FIG. 1 depicts a medical conduit/holding device 10 in accordance with the invention in use in a typical operating room environment. A surgeon, an anaesthesiologist and a scrub nurse stand in a defined sterile area surrounding a patient on an operating table. A circulating nurse appears in the background, outside the sterile area. The surgeon is either cauterizing or else burning tissue with a laser or a like instrument which produces airborne hazardous smoke fumes as a result of the burnt tissue. The medical conduit/holding device 10 is elongated and extends between a nozzle end 12 and a base end terminating in a clamp fixture (see reference numeral 14 FIGS. 2 or 4). The operating table has a typical operating-table rail R. The rail clamp 14 is secured to the table rail R (FIG. 1) by use of a screw-type knob (16 in FIGS. 2 or 4), the screw of which passes through the clamp body 18 (see FIG. 2) and pushes against the table rail R (FIG. 1) to secure the medical conduit/holding device 10 in place. Encasing the medical conduit/holding device 10 is a plastic sheath 20 that extends between a substantially closed end 22 that forms a leak-proof seal on the nozzle 12, and an open end 24 adjacent the clamp fixture 14. Extended up inside the sheath 20 through the open end 24 thereof is an evacuator hose 26 that is connected to standard suction and filtration equipment located elsewhere operating room (not shown and not part of the invention).

Figure 2:
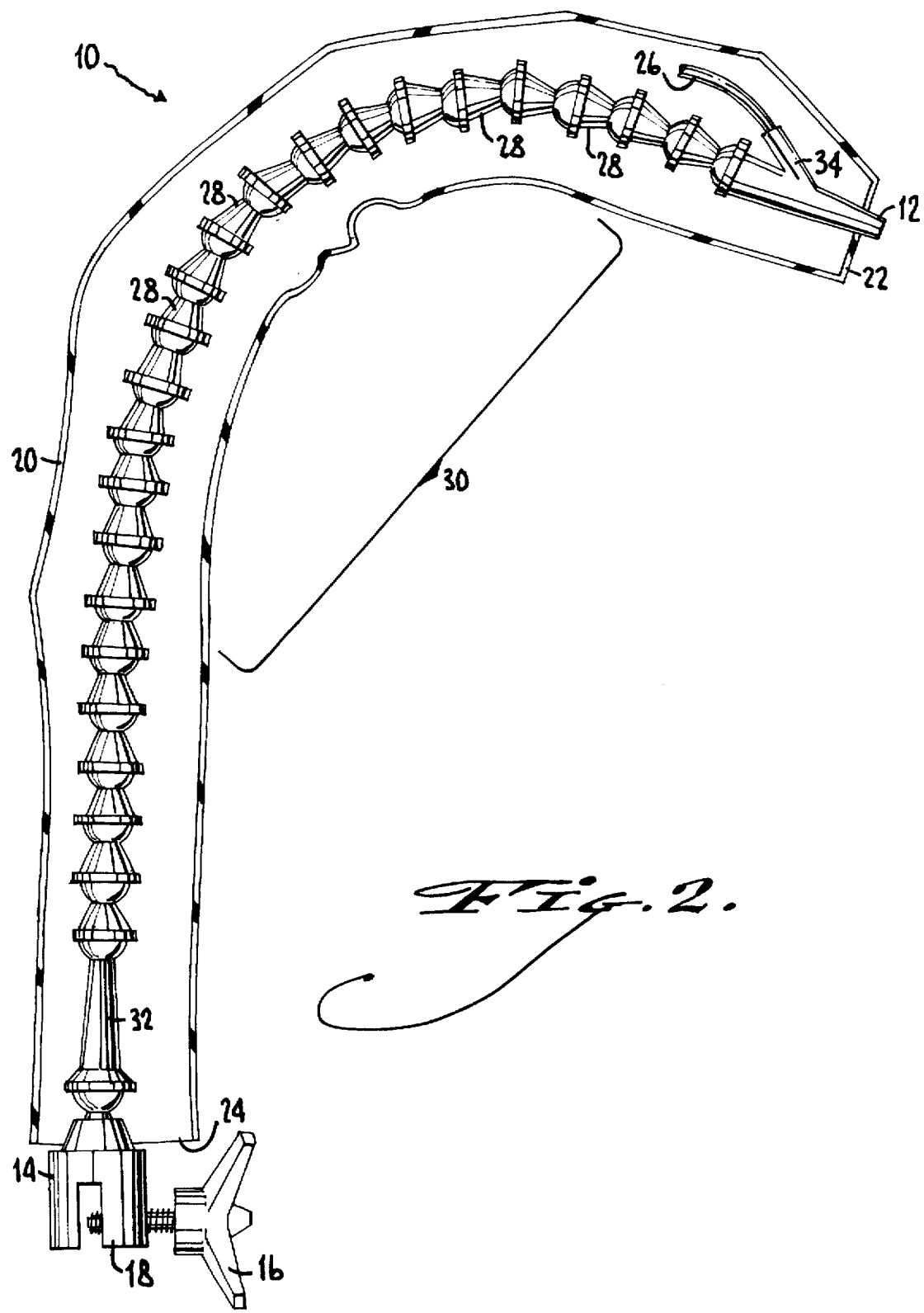
FIG. 2 is an enlarged perspective view of the medical conduit/holding device of FIG. 1.

FIGURE 2 shows better that the medical conduit/holding device 10 includes the clamp fixture 14 at the base end, the nozzle 12 at the free end, and numerous segments 28 connected in a chain to define an active length 30. As the terminology chain or active length is used here, such terminology signifies that the configuration of the chain 30 of segments 28 is changeable to various bent and straight alignments as desired. The active length 30 can be lengthened or shortened by adding or subtracting segments. The segments are commercially-available commodities as, for example, preferably the products selling under the brand name LOK-LINE™, of Lockwood Industries, an commercial establishment in the state of Oregon.

FIG. 1, the medical conduit/ holding device 10 is bent, flexed or configured into a given use position, with the nozzle 12 pointed and aimed close to the source of the burnt tissue fumes. Alternatively, after the cauterization or laser surgery is temporarily suspended or completed, the medical conduit/holding device 10 can be bent or re-configured in some retracted position (not shown) to get it out of the way of the surgeon(s) and nurse(s).

Returning back to FIG. 2, the active length 30 of the chain of segments 28 extends between the nozzle 12 and a base link 32 attached directly to the clamp fixture 14. The plastic sheath 20 covers substantially the entire medical conduit/ holding device 10, and has its closed end 22 punctured by the nozzle 12 to form a leak-proof seal, its opposite end 24 being open and aligned close near the clamp fixture 14.

The nozzle 12 has a branch 34 on it for connection thereto of the evacuator hose 26. The evacuator hose 26 is only partly shown in FIG. 2, but it extends the length of the medical conduit/holding device 10, to extend out the open end 24 of the sheath 20 (see FIG. 1) to connect up to suction and filtration equipment (not shown) stationed elsewhere in the operating room.

Figure 3:
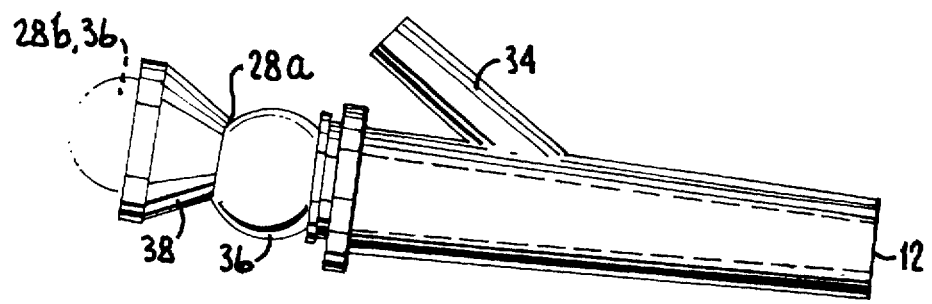
FIG. 3 is an enlarged perspective view of the nozzle of the medical conduit/holding device of FIG. 2.

FIG. 3 depicts the last segment 28a in the chain, the one that attaches to the nozzle 12. This terminal segment 28a is representative of the other segments 28 in the chain 30. The terminal segment 28a comprises a forward end 36 given an outer contour of a spherical ball, and a rearward conical end 38 in which is recessed a matching spherical cavity (not in view). The terminal segment 28a is connected with the previous like segment 28b (partly shown in broken lines) by virtue of spherical ball 36 of the previous like segment 28b press-fitted forcefully into the spherical cavity in the rearward end 38 of the terminal segment 28a. By this arrangement, a chain 30 of is formed by connecting together numerous of these segments 28 (i.e., see FIG. 2). This chain 30 allows considerable articulation of the active length 30 of the chain as a whole. FIG. 2 shows one bent position for the chain 30. However, the chain 30 can be configured in an indefinite number of alternate positions as well.

The fit between each two segments 28' interconnected spherical ball 36 and cavity 38, is sufficiently close so that, in the absence of a substantial external force, frictional gripping between the ball 36 and cavity 38 holds the alignment between two segments 28 stationary in a given relative alignment. However, a surgeon or nurse can grab the medical conduit/holding device 10 near the nozzle 12 and bend, flex or otherwise configure it to a position and alignment where the nozzle 12 is aimed in about any direction at about any location above the operating table. The surgeon or nurse, after having thrust the nozzle 12 in the desired angle of attack, need only to release their grasp on the medical conduit/holding device 10 and it instantly retains the given alignment and position rigidly, and remains rigid in that given alignment and position as long as no other like external force is applied to it.

The medical conduit/holding device 10 has flexion properties which make it unlike the goose neck holding devices of the prior art (not shown). The goose neck devices of the prior art are resilient or springy. They always want to return to their normal, un-flexed state after flexion. The medical conduit/holding device 10 has no "memory" of its prior state of configuration. It does not seek to return to a normal un-flexed state because it has none. It is a desirable aspect of this arrangement of interlocking segments 28 that there is no bounce in the medical conduit/holding device 10 after it has been configured and reconfigured form one position and alignment to the next.

Each segment 28 is substantially hollow. The chain 30 of segments 28 (see FIG. 2) thus defines a core passage or "lumen" (not illustrated) which allows communication between the terminal segment 28a and base link 32, if that is desired, regardless of the extent of flexion of the active length 30. The active length 30 can be given greater rigidity and holding power by inserting straight hollow plastic pieces (not shown) at desirable intervals within the lumen.

Figure 5:
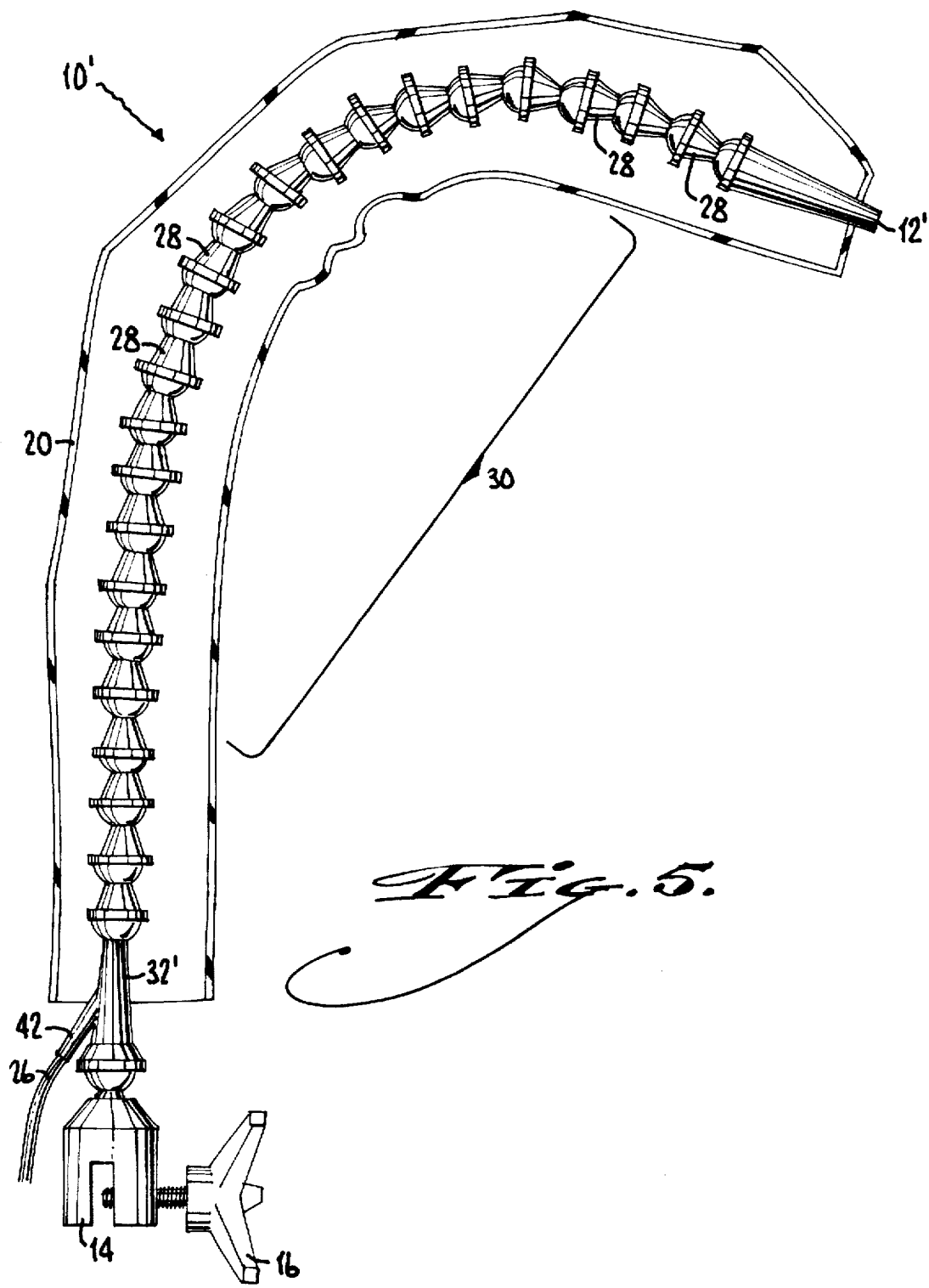

FIG. 5 shows and alternate embodiment of the medical conduit/holding device 10' in accordance with the invention. The alternate embodiment 10' comprises the same clamp fixture 14 and same arrangement of chained segments 28 as the FIG. 2 embodiment. The alternate embodiment 10' has an alternate configuration of a nozzle 12' and an alternate configuration of a base link 32'. The FIG. 5 nozzle 12' lacks the branch 34 of the FIG. 2 nozzle 12. The FIG. 5 base link 32' includes a branch 42 as formerly appeared on the FIG. 2 nozzle 12. The FIG. 5 medical conduit/holding device 10' allows at least two possible ways to connect the nozzle 12' in communication with the evacuator hose 26. In accordance with one way, the evacuator hose 26 is inserted through the branch 42 in the base link 32' and extended all the way through the lumen (not illustrated) defined by the chained segments 28 until the hose 26 is connected to an appropriate hose fitting (not shown) within the rear end of the nozzle 12'. In accordance with another way, the base link 32' forms an inverted-Y shaped coupler (i.e., FIG. 5). The evacuator hose 26 is connected as shown in FIG. 5 to the Y-coupler 32'. The lumen defined by the chained segments 28 forms the actual vacuum conduit between the Y-coupler 32' and nozzle 12'. The sheath 20 is pre-packaged in sufficiently sterile condition for use in the sterile area of the operating room. The sterile sheath 20 protects the sterile area in the operating room from any non-sterile components (if any) enclosed by the sheath 20.

In summary, nozzle 12 in accordance with the invention can be put in communication with the suction drawn by the evacuator hose 26 by at least three ways. First, the evacuator hose 26 can be connected to a branch 34 on the nozzle 12, and extended along the outside of the chained segments 28 to exit the plastic sheath 20 at its open end 24 near the clamp fixture 14 (i.e., FIG. 2). Second, the evacuator hose 26 can be extended in through the lumen (not shown) of the chained segments 28 to connect to an appropriate hose fitting (not shown) within the rear end of the nozzle 12' (compare or refer to FIG. 5). Third, the evacuator hose 26 can be connected to an appropriate branch 42 on a Y-coupler 32' near the base end 14 of the medical conduit/holding device 10, after which the lumen of the chained segments 28 is relied upon to act as the vacuum conduit between the Y-coupler 32' and nozzle 12' (see FIG. 5). In any of these arrangements, the plastic sheath 20 can be made from a suitable material that protects the sterile area of an operating room from any non-sterile chained segments 28 and/or base link 32/32' (if non-sterile) when enclosed in the sterile sheath 20.

Figure 4:
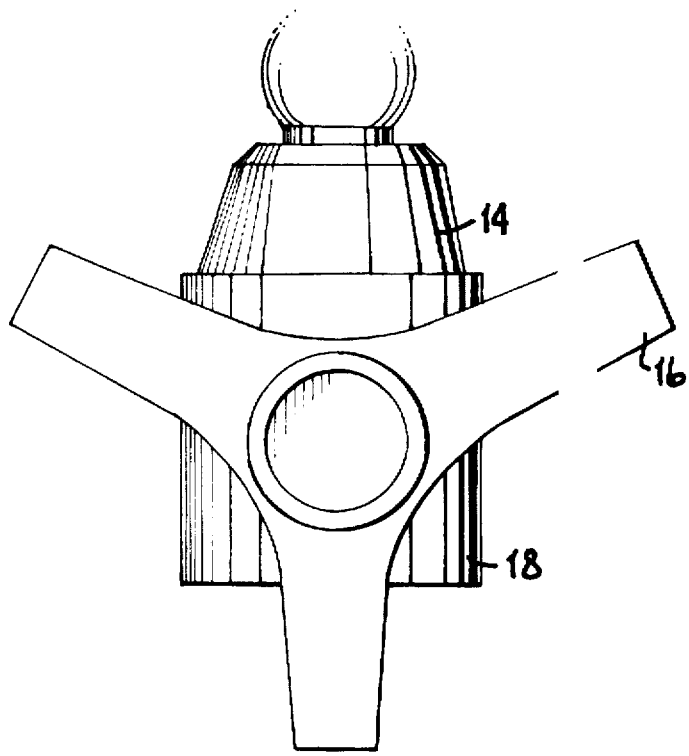
FIG. 4 is an enlarged perspective view of the clamping fixture of the medical conduit/holding device of FIG. 2; and, FIG. 5 is a perspective view comparable to FIG. 2 of an alternate embodiment.

In use, the medical conduit/holding device 10 includes several components mentioned above which may be designated for re-use or disposal, for reasons as explained next. Preferably the clamping fixture 14 as shown by FIG. 4 as well as FIGS. 2 and 5, is designated reusable. It is a relatively expensive article of manufacture, and is made of mixed materials such as metal and thermoset resinous materials and the like that can withstand sterilization in an autoclave and the like between uses. One the other hand, if desired, it may be preferred preferable if the plastic sheath 20 always be designated disposable after one use. The plastic sheath 20 is a relatively inexpensive item and the comparative costs of attempting to sterilize one after a use versus disposing of it in favor of new unused one, at least at the present time, weighs heavily in favor of disposing the plastic sheath 20 after use. The nozzle 12 might preferably be designated disposable since it is used close-up to the point of the operation and may gather splash-back and the like. However, it too can be made of hard materials that will withstand high temperature sterilization procedures such as autoclave baking and the like. Also, the decision on what to do with the nozzle 12 partly depends on what is done with the active length 30 of chained segments 28.

The active length 30 of the chained segments 28 presents a close question. Each segment 28 is made of a relatively hard resinous polymer material such as nylon or Teflon® and the like. Thus the segments 28 can withstand high temperature sterilization procedures. However, the chain 30 as a whole is only moderately expensive and the cost of sterilization versus the cost of replacement could, in different situations, favor disposal rather than reuse.

Given the foregoing, the medical conduit/holding device 10 in accordance with the invention is advantageous for positioning and aiming a nozzle 12 at hazardous smoke fumes generated by surgical procedures such as cauterization and/or laser surgery. To connect the nozzle 12 to standard suction and filtration equipment (not shown) via various suitable and commercially available flexible hoses 26, gives the surgeon(s) and nurse(s) at an operating table a more effective instrument to remove airborne hazardous smoke fumes as a health and safety precaution. The medical conduit/holding device 10 is easily contorted and configured into diverse positions and alignments upon grabbing and thrusting the nozzle 12 in the direction that any user wants the nozzle 12 pointed. The medical conduit/holding device 10 holds its position steadily after having been flexed and configured, until re-configured into a new use position or else retracted out of the way after use by the surgeon or nurse.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A medical device for aiding evacuation of airborne and hazardous biological smoke fumes produced by surgically burnt tissue in an operating room, the device comprising:

a nozzle;

a hose fitting connected in fluid communication with the nozzle;

a base fixture for mounting to a stable support structure in the operating room;

an elongated chain of multiple inter-connected segments, which chain extends between and interconnects the nozzle and base fixture; and, an elongated flexible liner encasing the nozzle and chain substantially from a point of origin about the nozzle, to a point of termination toward the base fixture;

wherein, each one segment is configured to be capable of connecting to another adjacent segment such that frictional gripping between the one and other segment holds the one and other segments in a relatively rigid given alignment, the segments being further configured such that the frictional gripping therebetween can be sufficiently overcome by an applied external force such as the gripping and pulling and thrusting by a user so that the alignment of the chain as a whole is diversely changeable from one given alignment of relative flexion to another; and, wherein the hose fitting and sheath are sized and arranged to permit a evacuator hose connected to suction and filtration equipment to connect to the hose fitting and allow the evacuator hose to extend away to the suction and filtration equipment in a direction relatively away from the terminal end of the sheath; whereby aiming the nozzle at a source of the hazardous biological smoke fumes draws the fumes in through the nozzle and safely away to the suction and filtration equipment.

2. The of medical device of claim 1, wherein the elongated flexible liner has a substantially closed end at the point of origin thereof, whereby a user can form a seal between the closed end and nozzle by puncturing the nozzle through the closed end.

3. The of medical device of claim 1, wherein the hose fitting is formed as a branch off the nozzle such that the evacuator hose, when connected to the hose fitting, extends alongside the chain of segments and inside the liner, the evacuator hose thereby extending out the end of the liner at the point of termination thereof.

4. The of medical device of claim 1, wherein each segment is substantially hollow such that the chain of segments defines a lumen within, which lumen is sufficient in size to accept the insertion therein of the evacuator hose;

wherein one of the chain and the base fixture includes an exit for the evacuator hose remote from the nozzle; and, wherein the hose fitting is formed internally within the nozzle such that when the evacuator hose is connected to the hose fitting, the evacuator hose extends away inside the lumen of the chain and out through the exit, to extend off to the suction and filtration equipment.

5. The of medical device of claim 1, further comprising a coupler occupying a position between the base fixture and the chain of segments; and, wherein each segment is substantially hollow such that the chain of segments defines a lumen within, which lumen is sufficient in size to accept the insertion therein of the evacuator hose; and, the coupler includes a branch, portions of which are formed as the hose fitting, the coupler also being formed with an internal passage that allows fluid communication between the hose fitting and the lumen of the chain; whereby the lumen of the chain defines that portion of the suction conduit that extends between the nozzle and hose fitting.

6. The of medical device of claim 1, wherein the chain can be alternatively lengthened and shortened by respectively adding and removing segments.

7. The of medical device of claim 1, wherein the each segment is configured to interconnect with another adjacent segment via reciprocal ball and socket structures.

8. A medical device for aiding evacuation of airborne and hazardous biological smoke fumes produced by surgically burnt tissue in an operating room, the device comprising:

a nozzle formed internally with a hose fitting;

a base fixture for mounting to a stable support structure in the operating room;

an elongated chain of multiple interconnected segments, which chain extends between and interconnects the nozzle and base fixture; and, wherein, each one segment is configured to be capable of connecting to another adjacent segment such that frictional gripping between the one and other segment holds the one and other segments in a relatively rigid given alignment, the segments being further configured such that the frictional gripping therebetween can be sufficiently overcome by an applied external force such as the gripping and pulling and thrusting by a user so that the alignment of the chain as a whole is diversely changeable from one given alignment of relative flexion to another; and wherein each segment is substantially hollow such that the chain of segments defines a lumen within, which lumen is sufficient in size to accept the insertion therein of a given evacuator hose in the operating room;

one of the chain and the base fixture including an exit for the evacuator hose remote from the nozzle; whereby, when the evacuator hose is connected to the hose fitting, the evacuator hose extends away from the nozzle inside the lumen of the chain, and out through the exit, to extend off to suction and filtration equipment such that aiming the nozzle at a source of the hazardous biological smoke fumes draws the fumes in through the nozzle and safely away to the suction and filtration equipment.

9. A medical device for aiding evacuation of airborne and hazardous biological smoke fumes produced by surgically burnt tissue in an operating room, the device comprising:

a nozzle;

a base fixture for mounting to a stable support structure in the operating room;

a coupler, having a branch that forms a hose fitting, connected to the base fixture; and, an elongated chain of multiple inter-connected segments, which chain extends between and interconnects the nozzle and coupler; and, wherein, each one segment is configured to be capable of connecting to another adjacent segment such that frictional gripping between the one and other segment holds the one and other segments in a relatively rigid given alignment, the segments being further configured such that the frictional gripping therebetween can be sufficiently overcome by an applied external force such as the gripping and pulling and thrusting by a user so that the alignment of the chain as a whole is diversely changeable from one given alignment of relative flexion to another; and, wherein each segment is substantially hollow such that the chain of segments defines a lumen within, which lumen is sufficient in size to act as a conduit of biological smoke fumes drawn in through the nozzle;

wherein the hose fitting is sized to accept the connection thereto of a given evacuator hose in the operating room; whereby, when the evacuator hose is connected to the hose fitting, the evacuator hose extends away to suction and filtration equipment such that aiming the nozzle at a source of the hazardous biological smoke fumes draws the fumes in through the nozzle, through the length of the lumen to the coupler, and safely away to the suction and filtration equipment.

* * * * *